United States Patent
Iida et al.

(10) Patent No.: US 12,529,592 B2
(45) Date of Patent: Jan. 20, 2026

(54) WEIGHT MANAGEMENT DEVICE AND BIOLOGICAL INFORMATION MONITORING SYSTEM

(71) Applicant: MINEBEA MITSUMI Inc., Nagano (JP)

(72) Inventors: Norihito Iida, Nagano (JP); Toshiaki Nishimura, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 321 days.

(21) Appl. No.: 18/252,085

(22) PCT Filed: Nov. 5, 2021

(86) PCT No.: PCT/JP2021/040829
§ 371 (c)(1),
(2) Date: May 8, 2023

(87) PCT Pub. No.: WO2022/107623
PCT Pub. Date: May 27, 2022

(65) Prior Publication Data
US 2023/0408324 A1 Dec. 21, 2023

(30) Foreign Application Priority Data
Nov. 17, 2020 (JP) .................... 2020-190685

(51) Int. Cl.
*G01G 19/44* (2006.01)
*A61B 5/00* (2006.01)
*G01G 19/52* (2006.01)

(52) U.S. Cl.
CPC ......... *G01G 19/445* (2013.01); *A61B 5/6892* (2013.01); *A61B 5/7445* (2013.01);
(Continued)

(58) Field of Classification Search
CPC .... G01G 19/445; G01G 19/52; A61B 5/6892; A61B 5/7445; A61B 5/7475;
(Continued)

(56) References Cited

U.S. PATENT DOCUMENTS 4,869,266 A * 9/1989 Taylor .................. A61G 7/0527
600/587
6,095,949 A * 8/2000 Arai ....................... G16H 20/30
482/4
(Continued)

FOREIGN PATENT DOCUMENTS

JP H02-17108 U 2/1990
JP 2002-027355 A 1/2002
(Continued)

OTHER PUBLICATIONS

International Search Report for corresponding International Application No. PCT/JP2021/040829 mailed Nov. 30, 2021.
(Continued)

*Primary Examiner* — Jacques M Saint Surin
(74) *Attorney, Agent, or Firm* — Chrisman Gallo Tochtrop LLC

(57) ABSTRACT

A weight management device is used in a biological information monitoring system configured to monitor biological information of a subject on a bed (BD), based on a detection value of a load detector (LS1, LS2, LS3, LS4) configured to detect a load of the subject. The weight management device includes a housing, a display provided at an outer surface of the housing and configured to display a weight of the subject, based on the detection value, and an attachment portion provided at an outer surface of the housing and attachable to and detachable from the bed.

6 Claims, 5 Drawing Sheets

(52) U.S. Cl.
CPC ............ *A61B 5/7475* (2013.01); *G01G 19/52* (2013.01); *A61B 2562/0252* (2013.01)

(58) Field of Classification Search
CPC .......... A61B 2562/0252; A61B 5/1036; A61B 5/1115; A61B 5/6891
USPC ........................................................ 177/144
See application file for complete search history.

(56) References Cited

U.S. PATENT DOCUMENTS

| | | | | |
|---|---|---|---|---|
| 8,475,367 | B1 * | 7/2013 | Yuen ..................... | G16H 50/30 |
| | | | | 177/4 |
| 8,696,569 | B2 * | 4/2014 | Yuen .................... | A61B 5/1118 |
| | | | | 128/920 |
| 9,044,367 | B2 * | 6/2015 | Yakam ............... | A61G 7/05769 |
| 2002/0057390 | A1 | 5/2002 | Kurokawa | |
| 2006/0101581 | A1 | 5/2006 | Blanchard et al. | |
| 2014/0218198 | A1 | 8/2014 | Muneshima | |
| 2016/0199239 | A1 | 7/2016 | Kalka et al. | |
| 2018/0206793 | A1 | 7/2018 | Akatsu et al. | |

FOREIGN PATENT DOCUMENTS

| | | |
|---|---|---|
| JP | 2003-093356 A | 4/2003 |
| JP | 2004-024370 A | 1/2004 |
| JP | 4002905 B | 11/2007 |
| JP | 2011-010915 A | 1/2011 |
| JP | 4829020 B2 | 11/2011 |
| JP | 2014-147647 A | 8/2014 |
| JP | 2016-529934 A | 9/2016 |
| JP | 6105703 B1 | 3/2017 |
| JP | 2020-137722 A | 9/2020 |
| WO | 2017/056476 A1 | 4/2017 |

OTHER PUBLICATIONS

Written Opinion for corresponding International Application No. PCT/JP2021/040829 dated Nov. 30, 2021.
Extended European Search Report dated Sep. 16, 2024 for corresponding European Application No. 21894497.3.

* cited by examiner

WEIGHT MANAGEMENT DEVICE AND BIOLOGICAL INFORMATION MONITORING SYSTEM

CROSS-REFERENCE TO RELATED APPLICATIONS

This application is a national stage entry of International Application No. PCT/JP2021/040829 filed on Nov. 5, 2021, which claims the benefit of priority to Japanese Application No. JP2020-190685, filed Nov. 7, 2020, the entire disclosures of which are hereby incorporated herein by reference.

TECHNICAL FIELD

The present invention relates to a weight management device and a biological information monitoring system.

BACKGROUND ART

In the medical and long-term care fields, detecting a load of a subject on a bed via a load detector and acquiring biological information of the subject, such as a weight, a respiration rate, and a heart rate, based on the detected load has been proposed.

Patent Document 1 discloses a bed including a bed scale configured to measure a load applied to legs of the bed, and a display means for displaying a biological condition such as the weight of a measured subject staying on the bed, based on a detection result of the bed scale.

CITATION LIST

Patent Literature

Patent Document 1: JP 2003-93356 A

SUMMARY OF INVENTION

Technical Problem

The present invention has an object to provide a weight management device capable of easily managing the weight of a subject at a bedside and having high operability, and a biological information monitoring system including the weight management device.

Solution to Problem

A first aspect of the present invention provides a weight management device used in a biological information monitoring system configured to monitor biological information of a subject on a bed, based on a detection value of a load detector configured to detect a load of the subject, the weight management device including:
 a housing;
 a display provided at an outer surface of the housing and configured to display a weight of the subject, based on the detection value; and
 an attachment portion provided at an outer surface of the housing and attachable to and detachable from the bed.

In the weight management device according to the first aspect, the attachment portion may be configured such that a normal direction of the display is variable in a state where the attachment portion is attached to the bed.

In the weight management device according to the first aspect, the weight management device or the biological information monitoring system may include a weight calculation unit configured to periodically calculate a weight of the subject, based on the detection value.

In the weight management device according to the first aspect, the biological information monitoring system or the weight management device may include a notification control unit configured to make a notification related to biological information of the subject, based on a comparison between a change amount of a weight of the subject in a predetermined period and a predetermined threshold value.

The weight management device according to the first aspect may further include a stop button for stopping the notification, and the stop button may be provided at a central portion in a width direction of the housing.

The weight management device according to the first aspect may further include: a recording button; a history button; and a display control unit configured to control a display content of the display, wherein the display control unit may store, in a storage unit, a time at which the recording button is operated and a weight of the subject associated with the time, in association with each other, and may display, on the display, a weight of the subject stored in the storage unit together with an associated time, when the history button is operated.

The weight management device according to the first aspect may further include: a recording button; and a display control unit configured to control a display content of the display, wherein the display control unit may store, in a storage unit, a first weight of the subject associated with a first time, when the recording button is operated at the first time, may store, in the storage unit, a second weight of the subject associated with a second time later than the first time, when the recording button is operated at the second time, and may display, on the display, a difference between the first weight and the second weight.

A second aspect of the present invention provides a biological information monitoring system including:
 a load detector configured to detect a load of a subject on a bed;
 a biological information acquisition unit configured to acquire biological information of the subject, based on a detection value of the load detector; and
 the weight management device according to the first aspect.

Advantageous Effects of Invention

The weight management device according to the present invention can easily manage the weight of a subject at a bedside and has high operability.

BRIEF DESCRIPTION OF DRAWINGS

FIG. 4($b$) is a perspective view of the weight management device according to the embodiment as viewed from the rear side.

DESCRIPTION OF EMBODIMENTS

Embodiments

Biological Information Monitoring System 1000

First, a biological information monitoring system 1000 used together with a weight management device 100 (FIGS. 4(a) and 4(b)) according to an embodiment of the present invention will be described with reference to FIGS. 1 to 3.

Figure 1:
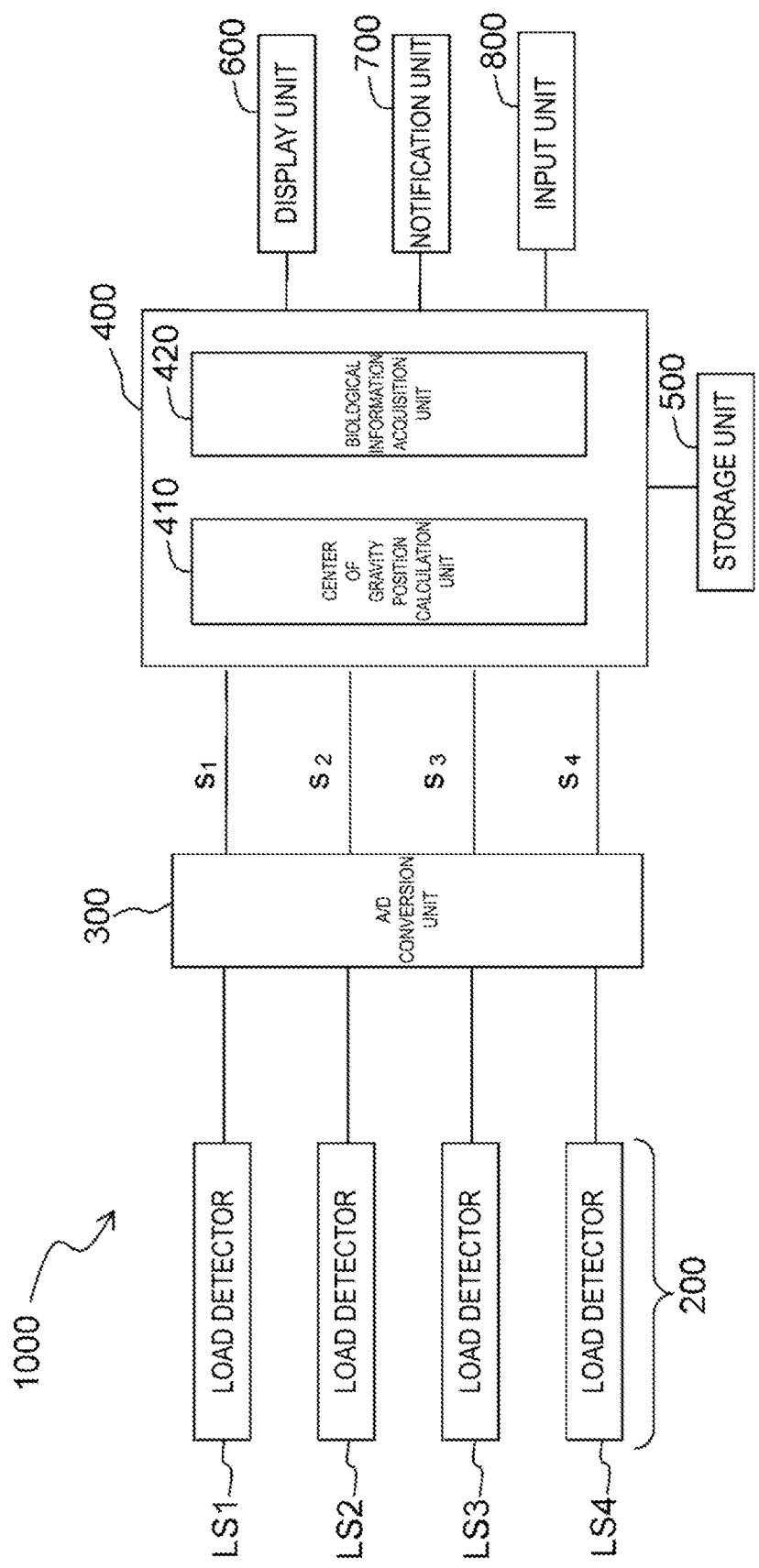
FIG. 1 is a block diagram illustrating a biological information monitoring system used together with a weight management device according to an embodiment.

As illustrated in FIG. 1, a biological state monitoring system 1000 according to the embodiment primarily includes a load detection unit 200, a control unit 400, and a storage unit 500. The load detection unit 200 is connected to the control unit 400 via an A/D conversion unit 300. A display unit 600, a notification unit 700, and an input unit 800 are connected to the control unit 400.

The load detection unit 200 includes four load detectors LS1, LS2, LS3, and LS4. Each of the load detectors LS1 to LS4 is a load detector configured to detect a load by using, for example, a beam type load cell. Such a load detector is described in JP 4829020 B and JP 4002905 B, for example. Each of the load detectors LS1 to LS4 is connected to the A/D conversion unit 300 by wiring or wirelessly.

Figure 2:
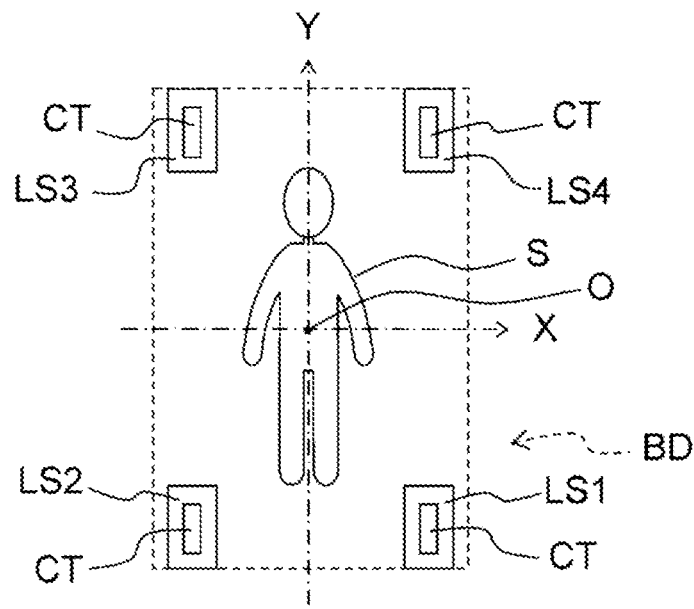
FIG. 2 is an explanatory view illustrating an arrangement of load detectors at a bed.

As illustrated in FIG. 2, the four load detectors LS1 to LS4 of the load detection unit 200 are disposed below casters CT of lower ends of legs at the four corners of a bed BD.

The A/D conversion unit 300 includes an A/D converter configured to convert an analog signal from the load detection unit 200 into a digital signal. The A/D conversion unit 300 is connected to the control unit 400 by wiring or wirelessly.

The control unit 400 is a dedicated or general-purpose computer, and a center of gravity position calculation unit 410 and a biological information acquisition unit 420 are built into an interior of the control unit 400. The center of gravity position calculation unit 410 calculates a center of gravity position of a subject, based on an output from the load detection unit 200. The biological information acquisition unit 420 calculates biological information of the subject, based on the output from the load detection unit 200 and the center of gravity position of the subject.

The storage unit 500 is a storage device configured to store data used in the biological information monitoring system 1000, and a hard disk (magnetic disk), for example, can be used.

The display unit 600 is an image display device, such as a liquid crystal monitor, configured to display information output from the biological information acquisition unit 420 of the control unit 400 to a user of the biological information monitoring system 1000.

The notification unit 700 includes a device, such as a speaker, configured to audibly provide a predetermined notification in response to an instruction from the control unit 400.

The input unit 800 is an interface for performing a predetermined input to the control unit 400, and may be a keyboard and a mouse.

Figure 3:
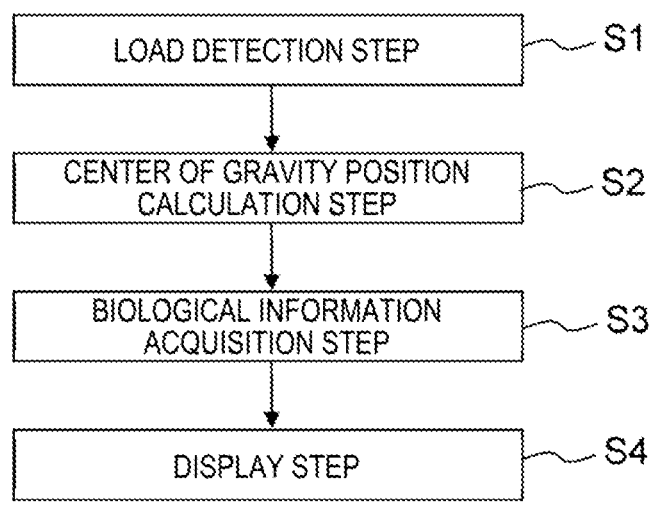
FIG. 3 is a flowchart indicating procedures of a method for monitoring biological information using the biological information monitoring system.

As illustrated in a flowchart in FIG. 3, monitoring of biological information by the biological information monitoring system 1000 primarily includes a load detection step S1 of detecting a load of a subject, a center of gravity position calculation step S2 of calculating a center of gravity position of the subject, based on the detected load (load value, detection value), a biological information acquisition step S3 of obtaining biological information (respiration rate or the like) of the subject, based on the load of the subject and/or the center of gravity position of the subject, and a display step S4 of displaying the acquired biological information of a subject S.

In the load detection step S1, the load detectors LS1 to LS4 are used to detect the load of the subject S on the bed BD. The load of the subject S on the bed BD is dispersedly applied to and dispersedly detected by the load detectors LS1 to LS4 disposed below the legs at the four corners of the bed BD.

The load detectors LS1 to LS4 each detect a load (load change) and output the load as an analog signal to the A/D conversion unit 300. The A/D conversion unit 300 converts the analog signal into a digital signal with a sampling period of, for example, 5 milliseconds, and outputs the digital signal (hereinafter, referred to as a "load signal") to the control unit 400. Hereinafter, the load signals obtained by digitally converting, in the A/D conversion unit 300, the analog signals output from the load detectors LS1, LS2, LS3, and LS4 are referred to as load signals $s_1$, $s_2$, $s_3$, $s_4$, respectively.

In a center of gravity track calculation step S2, the center of gravity position calculation unit 410 calculates a position G (X, Y) of the center of gravity G of the subject S on the bed BD, based on the load signals $s_1$ to $s_4$ from the load detectors LS1 to LS4, at a predetermined period T (for example, equal to 5 milliseconds that is the sampling period described above), and obtains a temporal variation (center of gravity track GT) of the position of the center of gravity G of the subject S. Here, (X, Y) indicates coordinates on an XY coordinate plane in which X is taken in a width direction and Y is taken in a length direction with a central portion of the bed BD as an origin O (FIG. 2).

The calculation of the position G (X, Y) of the center of gravity G by the center of gravity position calculation unit 410 is performed by the following calculation. In other words, G (X, Y) is calculated by the following equation, assuming that the coordinates of the load detectors LS1, LS2, LS3, and LS4 are $(X_1, Y_1)$, $(X_2, Y_2)$, $(X_3, Y_3)$, and $(X_4, Y_4)$, and detection values of the load of the load detectors LS1, LS2, LS3, and LS4 are $W_1$, $W_2$, $W_3$, and $W_4$, respectively.

[Mathematical Expression 1]

$$X = \frac{X_1 \times W_1 + X_2 \times W_2 + X_3 \times W_3 + X_4 \times W_4}{W_1 + W_2 + W_3 + W_4} \quad \text{(Expression 1)}$$

[Mathematical Expression 2]

$$Y = \frac{Y_1 \times W_1 + Y_2 \times W_2 + Y_3 \times W_3 + Y_4 \times W_4}{W_1 + W_2 + W_3 + W_4} \quad \text{(Expression 2)}$$

The center of gravity position calculation unit 410 calculates the position G (X, Y) of the center of gravity G at the predetermined sampling period T, based on Expression 1 and Expression 2 described above, obtains the temporal variation of the position G (X, Y) of the center of gravity G, that is, the center of gravity track GT, and stores the center of gravity track GT in, for example, the storage unit 500.

In the biological information acquisition step S3, the biological information acquisition unit 420 acquires the biological information of the subject S by using the load signals $s_1$ to $s_4$ received from the A/D conversion unit 300, the position of the center of gravity G calculated in the center of gravity position calculation step S2, the center of gravity track GT, and the like.

The acquired biological information is, for example, a respiration rate and a heart rate. An example of a method for acquiring a respiration rate and a heart rate of the subject by the biological information acquisition unit 420 is as follows.

Since human respiration is performed about 12 to 20 times per minute, the frequency of human respiration is about 0.2 to 0.33 Hz. Therefore, when a frequency analysis such as a Fourier analysis is performed on any one of the load signals $s_1$ to $s_4$, a frequency peak appears in positions corresponding to the frequency of the respiration of the subject S in a frequency band of 0.2 to 0.33 Hz. The biological information acquisition unit 420 may acquire the respiration rate of the subject S, based on the position of the frequency peak appearing in the frequency band.

Similarly, since the human heart beats about 30 to 200 times per minute, the frequency of the human heartbeat is about 0.5 to 3.3 Hz. Therefore, when a frequency analysis such as a Fourier analysis is performed on any one of the load signals $s_1$ to $s_4$, a frequency peak appears in positions corresponding to the frequency of the respiration of the subject S in a frequency band of 0.5 to 3.3 Hz. The biological information acquisition unit 420 may acquire the heart rate of the subject S, based on the position of the frequency peak appearing in the frequency band.

Another example of a method for acquiring a respiration rate and a heart rate of the subject by the biological information acquisition unit 420 is as follows.

Human respiration is performed by moving the thorax and the diaphragm to expand and contract the lungs. Here, at the time of inhalation, that is, when the lungs expand, the diaphragm moves downward and the internal organs also move downward. On the other hand, at the time of exhalation, that is, when the lungs contract, the diaphragm moves upward and the internal organs also move upward. As described in the specification of JP 6105703 B granted to the applicant, the center of gravity G vibrates (hereinafter referred to as a "respiration vibration") slightly when the internal organs move, and the direction of this vibration is substantially an extending direction (body axial direction) of the spine.

Therefore, the biological information acquisition unit 42 may specify a track of the respiration vibration of the center of gravity G included in the center of gravity track GT, and acquire the respiration rate of the subject S, based on the number of extreme points included in the specified track.

In the display step S4, the control unit 400 displays, on the display unit 600, the biological information acquired by the biological information acquisition unit 420.

Further, in the display step S4, in addition to or instead of the display using the display unit 600, a notification may be made by using the notification unit 700. In this case, for example, when the respiration rate of the subject S is equal to or less than a predetermined value, a notification sound is generated, notifying a nurse, a caregiver, or the like who is the user of the biological information acquisition system 1000 of a decrease in respiration of the subject S.

Weight Management Device 100

Next, the weight management device 100 according to the embodiment of the present invention will be described with reference to FIGS. 4 to 6.

Figure 4:
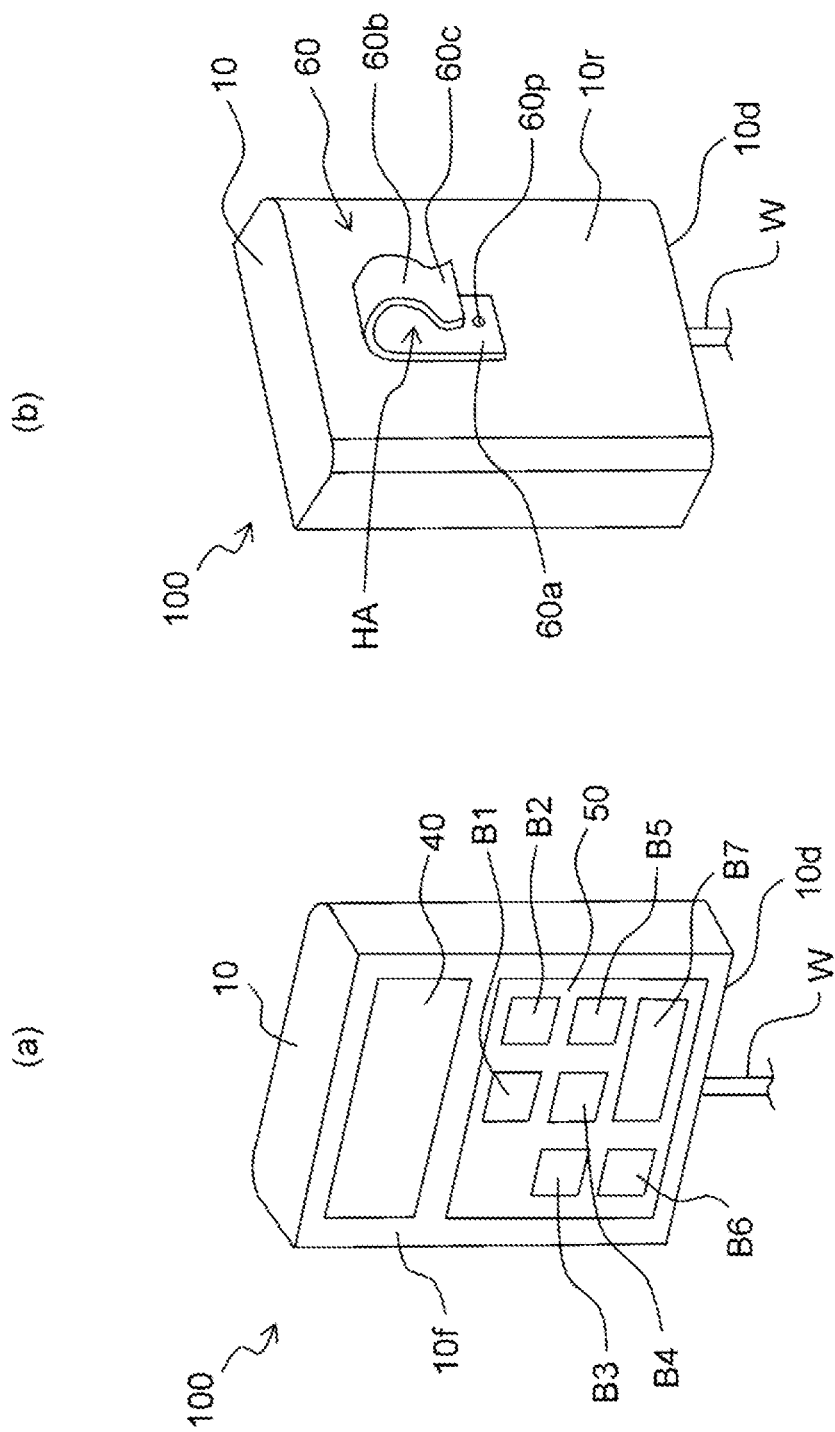
FIG. 4($a$) is a perspective view of the weight management device according to the embodiment as viewed from the front side.
Figure 5:
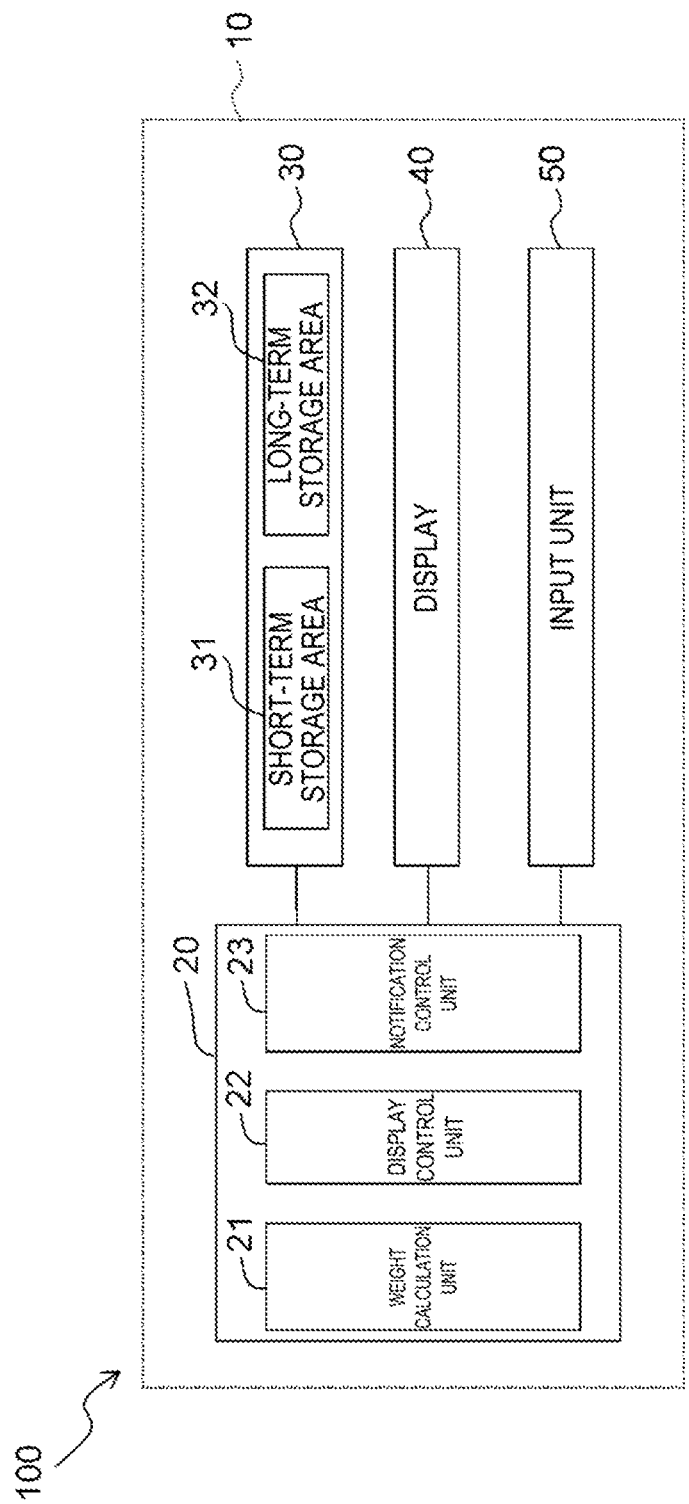
FIG. 5 is a block diagram of the weight management device according to the embodiment.

As illustrated in FIGS. 4 and 5, the weight management device 100 primarily includes a housing 10, a control unit 20 and a storage unit 30 housed inside the housing 10, a display 40 and an input unit 50 provided at a front surface 10f of the housing 10, and an attachment portion 60 provided at a rear surface 10r of the housing 10. A wire W that connects the biological information monitoring system 1000 and the weight management device 100 is connected to a lower surface 10d of the housing 10.

In the following description, the right side, the left side, the upper side, and the lower side when the front surface 10f is viewed from the front side are referred to as the right side, the left side, the upper side, and the lower side of the weight management device 100, respectively.

The housing 10 is a substantially rectangular parallelepiped box formed of resin (as an example, ABS). In FIG. 4(a), only an edge between the rear surface 10r and a side surface is rounded, but no such limitation is intended, and any desired edge may be rounded. In addition, one or a plurality of surfaces such as the front surface 10f and the rear surface 10r may be a protruding or recessed curved surface.

The control unit 20 is a dedicated or general-purpose computer. The control unit 20 includes a weight calculation unit 21, a display control unit 22, and a notification control unit 23. Details of operations of the weight calculation unit 21, the display control unit 22, and the notification control unit 23 will be described later.

The storage unit 30 is a storage device configured to store data used in the weight management device 100. The storage unit 30 includes a short-term storage area 31 and a long-term storage area 32. Both of the short-term storage area 31 and the long-term storage area 32 may be a RAM, a flash memory, or the like.

The display 40 displays a weight of the subject calculated by the weight calculation unit 21 of the control unit 20. The display 40 may be a liquid crystal display as an example. The display 40 according to the present embodiment is a horizontally long liquid crystal display disposed in a region about one-third from the top of the front surface 10f of the housing 10.

The input unit 50 is an interface for performing a predetermined input to the control unit 20. The input unit 50 according to the present embodiment is constituted of seven push buttons disposed in three rows in a region about two-thirds from the bottom of the front surface 10f of the housing 10.

The seven push buttons constituting the input unit 50 include a zero button B1 disposed at the center of the upper row, a recording button B2 disposed at the right of the upper row, a history button B3 disposed at the left of the middle row, a forward button B4 disposed at the center of the middle row, a backward button B5 disposed at the right of the middle row, a setting button B6 disposed at the left of the lower row, and a stop button B7 disposed at the right side of the setting button B6. The stop button B7 is larger than the other buttons. A part of the stop button B7 is located at the center in a left-right direction of the front surface 10f of the housing 10.

The buttons B1 to B7 of the input unit 50 are connected to the control unit 20 so as to provide a predetermined instruction to the control unit 20. The user of the weight management device 100 can operate the buttons B1 to B7 of the input unit 50 to provide an instruction to the control unit 20 of the weight management device 100 (details will be described later).

The attachment portion 60 is a fastener for detachably attaching the weight management device 100 to the bed BD. In the present embodiment, the attachment portion 60 is made of resin and has a shape in which a flat plate is curved into a substantially U shape.

As illustrated in FIG. 4(*b*), the attachment portion 60 includes a rectangular flat plate portion 60*a*, a curved portion 60*b* extending in an arc shape in a side view from one end side of the flat plate portion 60*a* in a longitudinal direction and folded back to the other end side of the flat plate portion 60*a* in the longitudinal direction, and a folded portion 60*c* extending in an arc shape in a side view from an end portion of the curved portion 60*b* and separated from the flat plate portion 60*a*. A holding area HA is defined in a region surrounded by the flat plate portion 60*a* and the curved portion 60*b*.

The attachment portion 60 is attached to the rear surface 10*r* of the housing 10 by a pin 60*p* penetrating the flat plate portion 60*a* and extending in a front-rear direction. The attachment portion 60 is pivotable about the pin 60*p*.

Next, a method for performing weight management of the subject S on the bed BD at the bedside by using the weight management device 100 together with the biological state monitoring system 1000 will be described.

(1) Attachment of Weight Management Device 100 to Bed BD

A user (for example, a doctor, a nurse, a care worker, or the like) of the weight management device 100 and the biological information monitoring system 1000 first connects the weight management device 100 to the biological information monitoring system 1000, and detachably attaches the weight management device 100 to the bed BD.

The weight management device 100 is connected to the biological information monitoring system 1000 by, for example, connecting the wire W to the A/D conversion unit 300. In this way, the load signals $s_1$ to $s_4$ are transmitted to the control unit 20 of the weight management device 100.

The weight management device 100 and the biological information monitoring system 1000 may be wirelessly connected to each other.

Figure 6:
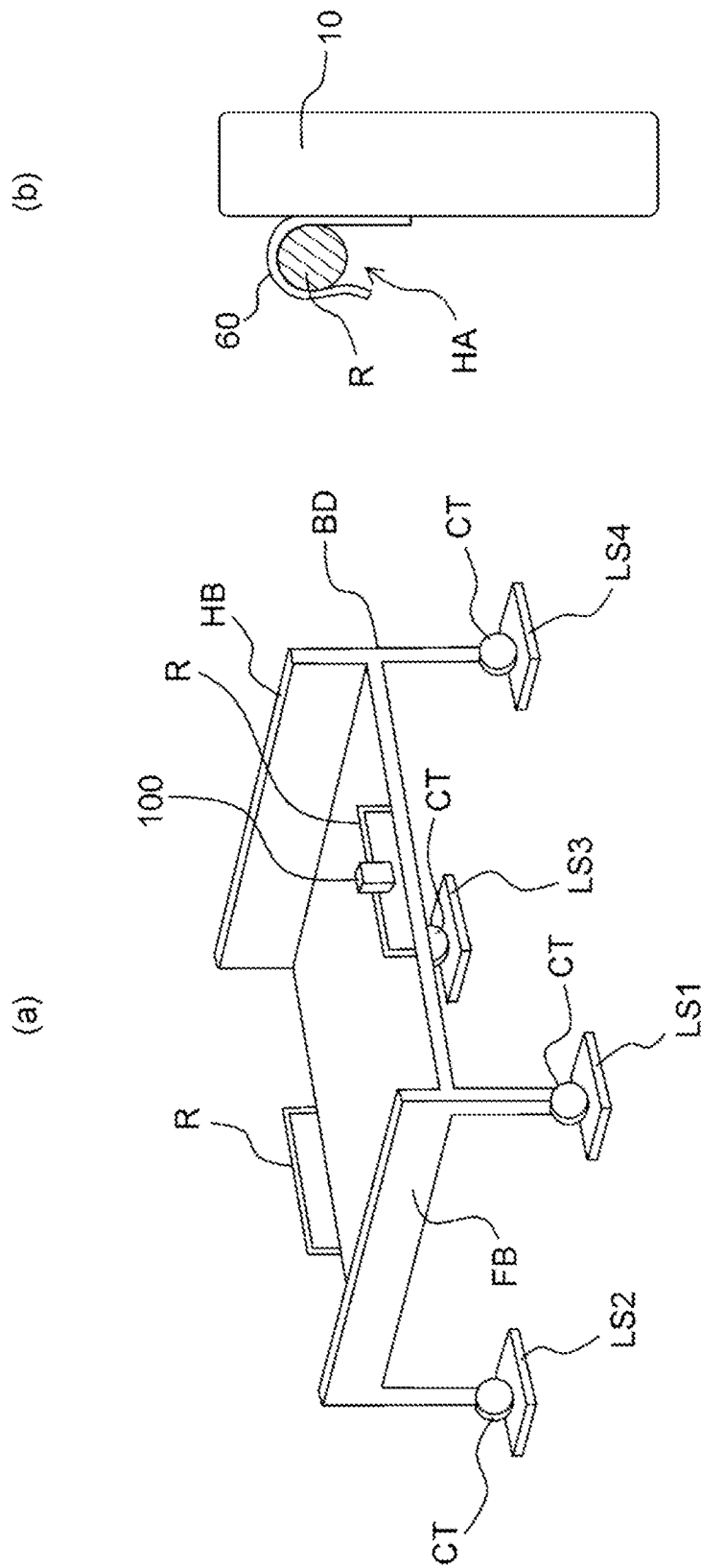
FIG. 6(a) is a perspective view of the bed to which the weight management device according to the embodiment is attached.
FIG. 6(b) is a side view of the weight management device attached to a fence of the bed via an attachment portion.

The weight management device 100 is attached to the bed BD by, for example, disposing a fence R in the holding area HA of the attachment portion 60 of the weight management device 100, and detachably attaching the weight management device 100 to the fence R of the bed BD (FIGS. 6(*a*) and 6(*b*)).

The weight management device 100 is movable relative to the bed BD in a state where the weight management device 100 is attached to the fence R of the bed BD. Specifically, the weight management device 100 is pivotable with a direction in which the fence R extends as an axial direction, and is pivotable with the pin 60*p* as an axial direction (i.e., with the front-rear direction of the weight management device 100 as an axial direction). Therefore, the user of the weight management device 100 can adjust an orientation of the display 40 (a normal direction of the display 40 and a vertical direction of the display) to a direction suitable for visually recognizing the display while the weight management device 100 is attached to the fence R of the bed BD.

(2) Calculation of Weight and Display of Weight

In a state of being connected to the biological state monitoring system 1000, the weight calculation unit 21 of the control unit 20 calculates the weight of the subject S, based on the load signals $s_1$ to $s_4$ from the A/D conversion unit 300 of the biological state monitoring system 1000. The weight of the subject S is calculated by, for example, adding the load values indicated by the load signals $s_1$ to $s_4$.

The display control unit 22 of the control unit 20 displays the weight of the subject S calculated by the weight calculation unit 21 on the display 40, and also stores the weight in the short-term storage area 31 of the storage unit 30.

In the present embodiment, the calculation and the display of the weight are continuously performed at a predetermined period (any period, but one second as an example). In other words, the weight calculation unit 21 calculates the weight at a predetermined period, and the display control unit 22 sequentially displays the calculated weight on the display 40, and stores the calculated weight in the short-term storage area 31 of the storage unit 30. Thus, a value of the weight displayed on the display 40 is updated to a latest value at the predetermined period. The weight stored in the short-term storage area 31 may be deleted after a lapse of a predetermined period of time.

A user can easily confirm a current weight of the subject S only by visually recognizing the display 40 of the weight management device 100.

(3) End-Sitting Position Determination and Bed Leaving Determination

The notification control unit 23 of the control unit 20 makes a predetermined notification, based on a variation amount of the weight of the subject S calculated by the weight calculation unit 21 at the predetermined period.

Specifically, each time the weight calculation unit 21 calculates the latest weight, the notification control unit 23 calculates a decrease amount from a past weight (as an example, a weight calculated one period before the latest weight; as another example, a weight calculated several seconds earlier). Then, the calculated decrease amount is compared with a predetermined threshold value th, and when the decrease amount is greater than the threshold value th, a terminal or the like carried by the user is caused to make a visual notification and/or an auditory notification via a communication unit (not illustrated).

For example, when the threshold value th is about 20 kg, a predetermined notification is made to the user when the weight of the subject S calculated by the weight calculation unit 21 decreases by about 20 kg. When the threshold value th is about 5 kg, a predetermined notification is made to the user when the weight of the subject S calculated by the weight calculation unit 21 decreases by about 5 kg.

A variation exceeding 20 kg of the calculated value of the weight in a short time, such as one period (here, one second) or several seconds, may generally occur when the subject S is in a state (i.e., a bed leaving state) of leaving the bed BD. Further, a variation exceeding 5 kg of the calculated value of the weight in a short time, such as one period (here, one second) or several seconds, may generally occur when the subject is in a state (i.e., an end-sitting position state) of sitting on an end portion of the bed with feet on the floor.

Therefore, by setting the threshold value th to about 20 kg, the user can cause the notification control unit 23 to make a notification when it is estimated that the subject S enters the bed leaving state. Further, by setting the threshold value th to about 5 kg, the user can cause the notification control unit 23 to make a notification when it is estimated that the subject S enters the end-sitting position state.

The user can set a value of the threshold value th by using the input unit 50. Specifically, for example, the setting button B6 of the input unit 50 is pressed to bring the threshold value th into a settable state, the forward button B4 is pressed to increase the threshold value th, and the backward button B5 is pressed to decrease the threshold value th. Further, when the user is performing some sort of notification operation in response to reception of a notification by a terminal carried by the user from the notification control unit 23, the user can stop (end) the notification operation by pressing the stop button B7 of the input unit 50 of the weight management device 100.

When the stop button B7 is pressed for a predetermined period of time, the notification control unit 23 is configured to stop the notification based on a comparison between a weight decrease amount and the threshold value th for a certain period of time. When it is known in advance that the subject S will leave the bed BD, the user can press the stop button B7 for a predetermined period of time to stop the notification, and avoid an unnecessary notification.

(4) Zero Reset

The user of the weight management device 100 can reset the calculated value in the weight calculation unit 21 to zero by pressing the zero button B1 of the input unit 50. In other words, a load applied at a time at which the zero button B1 is pressed is tared. By pressing the zero button B1 to perform the zero reset in a state where the subject S is not present on the bed BD, and then moving the subject S onto the bed BD, influence of an error factor can be suppressed and the weight of the subject S can be more accurately calculated.

(5) Recording of Weight and Display of History

By pressing the recording button B2 of the input unit 50, the user of the weight management device 100 can record the weight of the subject S at a time at which the recording button B2 is pressed. Further, the user can display the recorded weight of the subject S on the display 40 by pressing the history button B3, the forward button B4, and the backward button B5 of the input unit 50. Specific description is as follows.

When the user presses the recording button B2 of the input unit 50, the display control unit 22 of the control unit 20 stores, as a first recorded value $RV_1$ in the long-term storage area 32, a latest value of the weight of the subject S calculated by the weight calculation unit 21 at a time at which the recording button B2 is pressed. At this time, the display control unit 22 stores the first recorded value $RV_1$ in the long-term storage area 32 in association with a date and time (date and time) when the recording button B2 is pressed.

Each time the user presses the recording button B2 of the input unit 50, similar recording is performed. When the recording button B2 is pressed in a state where the first recorded value $RV_1$ is already recorded, a second recorded value $RV_2$ is recorded in the long-term storage area 32. In other words, when the recording button B2 is pressed in a state where an N-th recorded value $RV_N$ is already recorded, an (N+1)-th recorded value $RV_N+1$ is recorded in the long-term storage area 32. An upper limit of a value of N is any value, and may be about 7 to 10 as an example.

When the user presses the history button B3 of the input unit 50 in a state where at least the first recorded value $RV_1$ is stored in the long-term storage area 32, the display control unit 22 of the control unit 20 displays the recorded value stored in the long-term storage area 32 on the display 40 together with a date and time associated with the recorded value.

In a case where a plurality of recorded values are stored in the long-term storage area 32, the display control unit 22 switches the recorded value displayed on the display 40 when the forward button B4 is pressed to one older recorded value, and switches the recorded value displayed on the display 40 when the backward button B5 is pressed to one newer recorded value. In other words, when the forward button B4 is pressed in a state where the N-th recorded value $RV_N$ is displayed on the display 40, the display on the display 40 is switched to an (N−1)-th recorded value $RV_{N-1}$, and when the backward button B5 is pressed, the display on the display 40 is switched to the (N+1)-th recorded value $RV_{N+1}$.

Note that a value stored as the N-th recorded value $RV_N$ is not limited to a latest value at a time at which the recording button B2 is pressed, and may be a value at a predetermined timing having a predetermined correspondence with the time at which the recording button B2 is pressed (as an example, a timing shifted forward or backward by a predetermined time from the time at which the recording button B2 is pressed, and the like).

(6) Calculation of Weight Change Amount

By operating the recording button B2 and the setting button B6 of the input unit 50, the user of the weight management device 100 can calculate a difference between the weight of the subject S at a first time and the weight of the subject at a second time later than the first time.

Specifically, for example, the user presses the setting button B6 to set a difference calculation mode, and presses the recording button B2 at the first time. In this way, the display control unit B22 stores the weight of the subject S calculated immediately before the first time as a first weight in a predetermined area of the storage unit 30. Then, when the user presses the recording button B2 at the second time, the display control unit B22 calculates a difference between a second weight calculated immediately before the second time and the first weight stored in the storage unit 30, and displays the calculated value on the display 40.

Note that the values stored as the first weight and the second weight are not limited to the values calculated immediately before the first time and the second time, and may be values at a predetermined timing having a predetermined correspondence with the first time and the second time (as an example, a timing shifted forward or backward by a predetermined time from the first time and the second time).

The effects of the weight management device 100 according to the present embodiment are summarized below.

The weight management device 100 according to the present embodiment is detachably attached to the bed BD via the attachment portion 60. Therefore, the user can easily manage the weight of the subject S on the bed BD at the bedside.

Specifically, since the weight management device 100 is attachable to and detachable from the bed BD, the user can lift the weight management device 100 up to a height suitable for use by the user. Then, the user can visually recognize the display 40 and operate the input unit 50 in a position suitable for use by the user.

Further, the weight management device 100 according to the present embodiment is configured such that the normal direction of the display 40 is variable even in a state where the weight management device 100 is attached to the bed BD via the attachment portion 60. Therefore, even when the user does not remove the weight management device 100 from the bed BD, the user can visually recognize the display 40 in an excellent manner and easily operate the input unit 50 by setting the display 40 in a direction in which the display 40 is easily visually recognized.

In the weight management device 100 according to the present embodiment, the stop button B7 of the input unit 50 is disposed such that a part of the stop button B7 is located at the center in the left-right direction of the front surface 10f of the housing 10. Therefore, the user can easily press the stop button B7 with a thumb regardless of whether the user holds the housing 10 with a right hand or a left hand.

Modified Example

In the weight management device 100 according to the above-described embodiment, the following modifications can also be adopted.

In the weight management device 100 according to the above-described embodiment, the notification control unit 23 may be configured to store a notification content and a notification date and time in the long-term storage area 32 when a notification is made. The display control unit 22 may be configured to display, as a notification history on the display 40, the notification content and the notification date and time stored in response to an input from the input unit 50.

In the weight management device 100 according to the above-described embodiment, the control unit 20 includes the weight calculation unit 21, the display control unit 22, and the notification control unit 23, but no such limitation is intended. The control unit 20 may not include one or more of the weight calculation unit 21, the display control unit 22, and the notification control unit 23.

In this case, the biological information monitoring system 1000 (specifically, for example, the A/D conversion unit 300, the control unit 400, and the like) may be caused to perform the function of the configuration not included in the control unit 20 among the weight calculation unit 21, the display control unit 22, and the notification control unit 23 (that is, the biological state monitoring system 1000 may include at least one of the weight calculation unit 21, the display control unit 22, and the notification control unit 23). Further, the biological information monitoring system 1000 (specifically, for example, the A/D conversion unit 300, the control unit 400, and the like) may be caused to perform all the function of the control unit 20, and the control unit 20 may be omitted (that is, the biological state monitoring system 1000 may include the control unit 20).

In the weight management device 100 according to the above-described embodiment, the storage unit 30 and/or the input unit 50 may be omitted. The storage unit 30 may be included in the biological state monitoring system 1000.

In the management device 100 according to the above-described embodiment, the attachment portion 60 is a plate-like member having a substantially U shape in a side view and being hooked on the fence R of the bed BD, but no such limitation is intended. The attachment portion 60 may have any structure that allows the housing 10 to be detachably attached to the bed BD.

Specifically, for example, a clip-shaped member that clamps the fence R of the bed BD or a magnetic member attached to the fence R of the bed BD by magnetic force may be used as the attachment portion 60. The attachment portion 60 and the housing 10 may be connected to each other by a ball joint to increase a degree of freedom in changing a posture of the housing 10 with respect to the attachment portion 60.

An attachment position of the weight management device 100 to the bed BD is not limited to the fence R and may be any position. For example, the weight management device 100 may be detachably attached to a headboard HB (FIG. 5), a footboard FB (FIG. 5), a bed leg, or the like of the bed BD.

In the weight management device 100 according to the above-described embodiment, each button of the input unit 50 may be provided with an additional function. Specifically, for example, the stop button B7 may be provided with a function of stopping a nurse call or the like.

Alternatively, when the bed BD has a reclining function, the forward button B4 and the backward button B5 may be provided with a function of moving the bed BD up and down.

In the above-described embodiment, the weight management device 100 is described as an external device of the biological state monitoring system 1000. However, the weight management device 100 may be regarded as a part of the biological state monitoring system 1000.

The biological information monitoring system 1000 according to the above-described embodiment need not necessarily include all of the load detectors LS1 to LS4, and may only be provided with any one of the load detectors LS1 to LS4. Further, the load detectors need not necessarily be disposed at the four corners of the bed and can be disposed at any position so as to be able to detect the load and variations of the load of the subject on the bed. Further, each of the load detectors LS1 to LS4 is not limited to being a load sensor that uses a beam type load cell, and, for example, a force sensor can be used.

In the biological information monitoring system 1000 according to the above-described embodiment, each of the load detectors LC1 to LC4 is disposed below the caster CT attached to the lower end of the leg of the bed BD, but no such limitation is intended. The load detectors LS1 to LS4 may be respectively provided between the four legs of the bed BD and a bed board of the bed BD or, if the four legs of the bed BD can be vertically separated, may be provided between upper legs and lower legs.

In the biological information monitoring system 1000 according to the above-described embodiment, the load detection unit 200 may be formed of a large number of pressure-sensitive sensors (pressure sensors) disposed in a matrix below the subject lying on the bed, for example, below a sheet. In this aspect, a position of the center of gravity of the subject can be obtained based on outputs of the plurality of pressure-sensitive sensors.

The load detection unit 200 may also be integrally or detachably combined with the bed BD to constitute a bed system including the bed BD and the biological information monitoring system 1000 according to the above-described embodiment.

In the biological information monitoring system 1000 according to the above-described embodiment, a signal amplification unit configured to amplify a signal from the load detection unit 200, and a filtering unit configured to remove noise from the signal may be provided between the load detection unit 200 and the A/D conversion unit 300.

In the biological information monitoring system 1000 according to the above-described embodiment, the display unit 600 may include a simple visual display means, such as a printer for printing and outputting information indicating biological information, a light for displaying biological information, or the like instead of or in addition to the monitor. The notification unit 7 may be provided with a vibration generation unit configured to make a notification by vibration instead of or in addition to the speaker.

As long as the features of the present invention are maintained, the present invention is not limited to the embodiments described above, and other forms considered within the scope of the technical concept of the present invention are also included within the scope of the present invention.

INDUSTRIAL APPLICABILITY

According to the weight management device of the present invention, the weight of a subject can be managed easily with high operability at a bedside.

REFERENCE SIGNS LIST

10 Housing, 21 Weight calculation unit, 22 Display control unit, 23 Notification control unit, 30 Storage unit, 40 Display, 50 Input unit, 100 Weight management device, LS1, LS2, LS3, LS4 Load detector, 300 A/D conversion unit, 400 Control unit, 410 Center of gravity position calculation unit, 420 Biological information acquisition unit, 500 Storage unit, 600 Display unit, 700 Notification unit, 800 Input unit, 1000 Biological information monitoring system, BD Bed, S Subject

The invention claimed is:

1. A weight management device used in a biological information monitoring system configured to monitor biological information of a subject on a bed, based on a detection value of a load detector configured to detect a load of the subject, the weight management device comprising:
    a housing;
    a display provided at an outer surface of the housing and configured to display a weight of the subject, based on the detection value;
    an attachment portion provided at an outer surface of the housing and attachable to and detachable from the bed;
    an input unit; and
    a display control unit configured to control a display content of the display, wherein:
    the biological information monitoring system or the weight management device includes a notification control unit configured to make a notification related to biological information of the subject, based on a comparison between a change amount of a weight of the subject in a predetermined period and a threshold value set by using the input unit;
    the input unit includes a recording button; and
    the display control unit:
        stores, in a storage unit a first weight of the subject associated with a first time when the recording button is operated at the first time,
        stores, in the storage unit, a second weight of the subject associated with a second time later than the first time, when the recording button is operated at the second time, and
        displays, on the display, a difference between the first weight and the second weight.

2. The weight management device according to claim 1, wherein
    the attachment portion is configured such that a normal direction of the display is variable in a state where the attachment portion is attached to the bed.

3. The weight management device according to claim 1, wherein
    the weight management device or the biological information monitoring system includes a weight calculation unit configured to periodically calculate a weight of the subject, based on the detection value.

4. The weight management device according to claim 1, further comprising
    a stop button for stopping the notification, wherein
    the stop button is provided at a central portion in a width direction of the housing.

5. The weight management device according to claim 1, further comprising
    a history button, wherein
    the display control unit
    stores, in a storage unit, a time at which the recording button is operated and a weight of the subject associated with the time, in association with each other, and
    displays, on the display, a weight of the subject stored in the storage unit together with an associated time, when the history button is operated.

6. A biological information monitoring system comprising:
    a load detector configured to detect a load of a subject on a bed;
    a biological information acquisition unit configured to acquire biological information of the subject, based on a detection value of the load detector; and
    the weight management device according to claim 1.

* * * * *